United States Patent
Knotts et al.

[11] Patent Number: 6,065,002
[45] Date of Patent: May 16, 2000

[54] SIMPLIFIED INTERFACE FOR RELATIONAL DATABASE ACCESS USING OPEN DATABASE CONNECTIVITY

[75] Inventors: James Brian Knotts, Blue Bell; Robert Lynn Bailey, Phoenixville; Michael Fleming Clouser, Ephrata; Robert Eric Marsilio, Downingtown, all of Pa.

[73] Assignee: Systems and Computer Technology Corporation, Malvern, Pa.

[21] Appl. No.: 08/741,705

[22] Filed: Oct. 31, 1996

[51] Int. Cl.[7] .................................................. G06F 17/30
[52] U.S. Cl. .............................. 707/4; 707/103; 345/326
[58] Field of Search .................... 707/4, 103; 345/326

[56] References Cited

U.S. PATENT DOCUMENTS

| | | | |
|---|---|---|---|
| 5,263,167 | 11/1993 | Conner, Jr. et al. | 707/4 |
| 5,404,518 | 4/1995 | Gilbertson et al. | 707/3 |
| 5,418,950 | 5/1995 | Li et al. | 707/4 |
| 5,423,033 | 6/1995 | Yuen | 707/4 |
| 5,426,781 | 6/1995 | Kaplan et al. | 707/4 |
| 5,550,971 | 8/1996 | Brunner et al. | 707/3 |
| 5,555,403 | 9/1996 | Cambot et al. | 707/4 |
| 5,584,024 | 12/1996 | Shwartz | 707/4 |
| 5,608,899 | 3/1997 | Li et al. | 707/4 |
| 5,617,528 | 4/1997 | Stechmann et al. | 345/326 |
| 5,664,173 | 9/1997 | Fast | 707/4 |
| 5,752,027 | 5/1998 | Familiar | 707/103 |
| 5,832,496 | 11/1998 | Anand et al. | 707/102 |
| 5,878,411 | 3/1999 | Burroughs et al. | 707/4 |

*Primary Examiner*—Thomas G. Black
*Assistant Examiner*—Charles L. Rones
*Attorney, Agent, or Firm*—Barry R. Lipsitz

[57] ABSTRACT

A user interface is provided to a relational database to provide simplified data access for users. A user input/output device interacts with an application tool accessible via a computer. A template accessible to the application tool via an API or native interface provides a selection of attributes corresponding to a particular category. The attributes specify information obtainable from data stored in the relational database and are selectable using the application tool. The template is responsive to attributes selected using the application tool, for retrieving data from the relational database and forwarding the data to the application tool via the API or native interface. The template is independent of the application tool, thereby enabling the user interface to access information from the relational database using any of a plurality of different application tools. Functions are also provided for use in calculating complex attributes from data contained in the database, where the complex attribute is not itself contained in the database.

13 Claims, 5 Drawing Sheets

PEOPLE REPORT

| Name | AGE | ADDRESS |
|---|---|---|
| John A. Doe | 40 | 10 Main St., Lima OH 97123 |
| Ray E. Jones | 42 | 7 Elm St., Norwalk CT 06840 |
| Jane G. Roe | 23 | 48 Yew La., Ronks PA 18530 |

FIG. 5

SIMPLIFIED INTERFACE FOR RELATIONAL DATABASE ACCESS USING OPEN DATABASE CONNECTIVITY

BACKGROUND OF THE INVENTION

The present invention relates to relational databases and more particularly to a user interface for providing simplified access to such a database, thereby facilitating the use of data from the database for, e.g., the generation of reports, population of spreadsheets, and statistical analysis.

Relational databases have brought significant technological benefits to business and industry. Such benefits include increased rates of performance, efficient processing of large volumes of transactions, reductions in disk space, ability to model real world data structures and capability for enterprise wide computing. Despite all of the technical benefits of a relational database, reporting for the end user is still a difficult, complex and time consuming task. With all the business decisions facing companies today, information must be easily and instantaneously retrieved for query and reporting by the end user. As many have discovered, a relational database alone cannot hide from the end user the complexity of its architecture or the intricacies of the Structured Query Language (SQL) associated with a modern relational computer system. Individuals want to interact directly with the computer systems that affect them, bypassing traditional interactions with system experts or gatekeepers. Individuals also want to perform that interaction at the time and place of their choosing and utilize tools and equipment that are familiar and comfortable to use.

Reporting for the end users has traditionally been accomplished through a large cadre of standard reports. These reports have either been provided with a vendor's application software and/or written by internal technical staff. Such standard reports have typically been implemented as batch processes that followed a set schedule such as daily, weekly, or monthly processing cycles. These types of reports only reported on standard processes such as payroll, accounting month end close, accounts receivable, accounts payable, or customer billing.

Reports produced by batch processes have satisfied the end user requirements for a brief period. But with more and more information being stored electronically and corresponding advancements in technology, end user's needs for information have increased at a rapid pace.

In addition, end user information and reporting requirements are typically specific in nature and must be met immediately. No longer does the standard report satisfy the different ways in which one needs to view the data. Traditional corporate ad-hoc reporting consisted of a request to the information technology (IT) staff to produce the report in a third generation language. By the time the request was satisfied, the need for the information was often obsolete. The decision making processes found in today's businesses cannot wait for the IT staff to satisfy management's needs. Managers need to get at the information themselves, in a straightforward, user friendly and consistent manner.

The need for on demand information led to a new market of reporting tools. These tools can be broken down into two categories, known as "programmer productivity" and "end user reporting."

The programmer productivity tools offer a point and click interface to mask the syntactical complexities of Structured Query Language (SQL). These tools are ideal for programmers to create complex reports. However, if the programmer does not understand the structures and complexities of the database, the effectiveness and correctness of the data is jeopardized.

End user reporting tools market a strong graphical user interface called WYSIWYG (What You See Is What You Get). This, coupled with buttons and scroll bars, produces powerful formatting and graphic enabling capabilities that enable the end user to quickly build reports. However, end users become frustrated when they begin to use these types of reporting tools because the complexities of the relational database structure still exist. This leads to incorrect results and/or inefficient utilization of machine resources.

Many of today's relational applications contain thousands of tables and attributes. What is required for these types of systems to meet the needs of the end user is a component that makes access to the data simple. Preferably, a layer would be provided that simplifies the relational database into a format that can be recognized by the casual end user and be compatible with the WYSIWYG report writers that exist today. The industry has taken an approach to providing a solution for this component by creating "meta data" and "data warehouses."

Meta data is data about data. Report writer vendors have recognized the need for a meta data layer in order for their report writers to offer a solution to end users of relational databases which hides the overall complexities of the data. Many report writers on the market have such a layer. However, due to the lack of industry standards, each report writer's meta data layer is proprietary. What this means is that each report writer that needs access to the relational data needs a separate meta data component. This creates a lot of additional effort for each access tool. A company supporting four report writers, for example, could need four separate meta data layers. Under this method, consistency of access is greatly jeopardized as well.

Data warehousing is another way to simplify complex relational structures. This method requires replication of the data. This solves the simplification issue but creates a large number of other issues such as synchronizing the data with the transaction system, additional storage and CPU usage. It also often causes large amounts of processing just to produce the data store.

It would be advantageous to eliminate the need for separate meta data components and to overcome the disadvantages of data warehousing. In particular, it would be advantageous to provide a scheme in which the meta data layer is stored with the relational data itself. Such a meta data access layer scheme should provide simplified access to data by the majority of existing and future report writers, statistical analysis tools, spreadsheets, desktop tools, and the like.

It would be further advantageous to provide a scheme which facilitates the creation of a data warehouse by providing a virtual warehouse above the relational database. Conversely, if persistence storage is desired, it would be advantageous for the scheme to have the ability to populate the data warehouse using a simplified interface.

It would be still further advantageous for a simplified interface to provide a user mapping to the data in the underlying database. One of the first steps in implementing such a scheme would be to gather the requirements of the user, e.g., by modeling the data requirement by business function. In this manner, the data model could be composed without regard to any technical implications, provided the underlying information is stored in the relational database.

The present invention provides a user interface enjoying the above and other advantages. More particularly, the invention disclosed herein provides a layer of abstraction that connects a transaction oriented relational database to a simplified reporting layer. The simplified reporting layer is universal in nature and able to interface to tools that the user can access to produce meaningful information.

SUMMARY OF THE INVENTION

The present invention provides a user interface for accessing data from a relational database. A user input device interacts with an application tool accessible via a computer. An interface module, which may, for example, comprise an application program interface (API) or native interface, is provided. A template accessible to the application tool via the interface module provides a selection of attributes corresponding to a particular category, such as a business function. The attributes specify information obtainable from data stored in the relational database, and are selectable using the application tool. The template is responsive to selected attributes received from the application tool via the interface module, for retrieving data from the relational database and forwarding the data to the application tool via the interface module for use in generating an output. The template is independent of the application tool, thereby enabling the user interface to access information from the relational database using any one of a plurality of different application tools.

At least one function can be provided which is responsive to the template for calculating a complex attribute from data contained in the database. The complex attribute itself is not contained in the database. In a practical system, a plurality of functions responsive to the template will typically be provided. Each function calculates a different complex attribute from corresponding data in the database.

Moreover, a practical system will generally contain a plurality of different templates, each providing a set of attributes corresponding to a different category. The attributes specify information obtainable from data stored in the relational database for their associated category. For example, an interface in accordance with the invention for use by an academic institution may contain templates for categories such as employee data, student data, purchasing data, recruiting data, and people. Each template would provide a list of attributes from which a user could select to generate a desired database report.

In order to provide cross platform compatibility, wherein the interface can be used by any one of a number of different application tools, the application tool, the templates and the database all communicate via the common interface module, which, as already noted, may comprise an application program interface (API) or a native interface. For example, the open database connectivity (ODBC) API from Microsoft® Corporation can be used to enable compatibility of the user interface with different application tools that are all compatible with ODBC. Examples of such application tools are report writers, statistical analysis tools, spreadsheets and desktop tools.

The template selected via the user interface will directly access the selected attributes when these attributes are stored in the database. Where an attribute cannot be directly retrieved, but requires calculation using a function, the template will obtain data from the database that is required by the function in order to calculate such a "complex attribute." It should be understood that the user is completely insulated from the functions. User selection of attributes is made via the template, and there is no reason for the user to know whether the information being asked for is directly stored or must be computed from data that is stored in the database. In certain circumstances, the template may require a user to designate, via the application tool, information for at least one mandatory condition. For example, a user interface designed for an academic institution may require, as a mandatory condition, the identification of a particular school term when information is solicited about a student.

BRIEF DESCRIPTION OF THE DRAWINGS

FIG. 5 is an illustration of an example report generated using the "people" template of FIG. 4.

DETAILED DESCRIPTION OF THE INVENTION

The present invention provides a simplified user interface to a relational database using an architecture which is object oriented and provides for a level of abstraction above the transactional database structure. This architecture is then made accessible to the many commercial report writers, spreadsheets and other information appliances available to users. The invention provides for consistency across the functional model by reusing the same common functions over and over and by making the same objects available to them simultaneously through the same meta data implementation. The functions and views that compose the system have the ability to interact with a concept that the user customizes that alters the way the object behaves. The end user, through the information appliance (e.g., a personal computer, personal communication system (PCS), Internet surfer, etc.), interacts at a level of abstraction that is far simpler than the details in the relational database.

The invention is described herein, for purposes of example, in the context of an end user report. An end user report could be any information that an end user would typically require. Reports could be spreadsheets, a mailing label, a listing, a graph etc. In accordance with the invention, a virtual layer is provided between the transactional relational database and the information appliance. Typically, the end user does not have the knowledge to construct a suitable database query. Also, a first end user may have a different interpretation of the database than a second end user. Thus, the virtual layer provides a simplified access to data, enabling the generation of accurate and consistent reports without an understanding of the underlying database.

Figure 1:
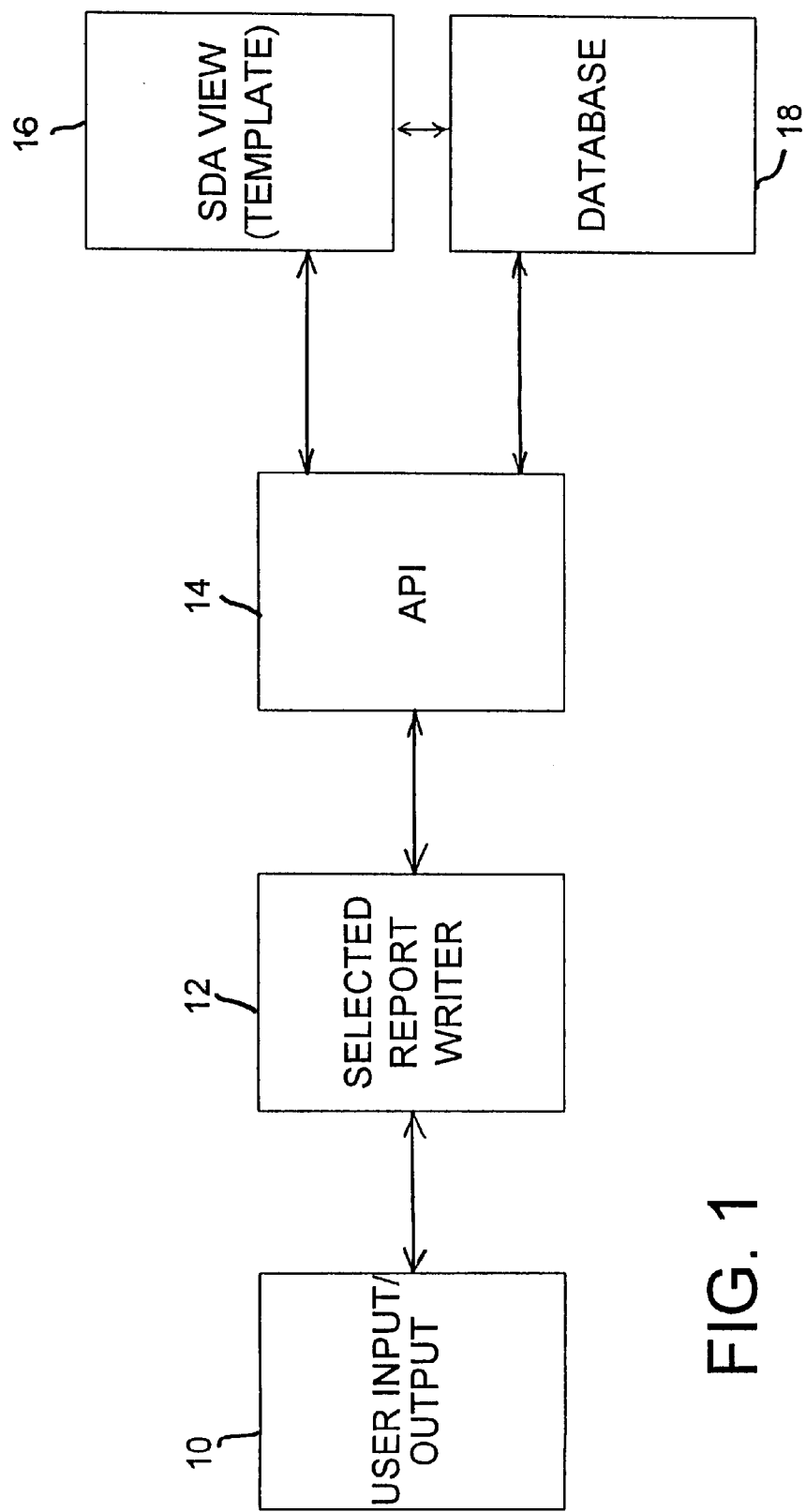
FIG. 1 is a block diagram illustrating a user interface in accordance with the present invention.

FIG. 1 illustrates the key components of a system in accordance with the present invention. User input/output devices 10, which may comprise, for example, a keyboard, mouse and/or voice recognition device, enable a user to communicate with a selected report writer 12. Examples of such report writers are Microsoft® Access and Lotus 1-2-3. It should be appreciated that many other application tools could be used, and it is an important feature of the invention that the simplified access provided is compatible with any application tool that is compliant with the application program interface (API) 14 through which the template 16 and database 18 communicate. The template, also referred to as a simplified data access (SDA) view or "container" is a meta data component that any application compliant with API 14 can communicate with. Thus, the templates provided by the present invention are not application specific.

API 14 can comprise, for example, ODBC. Alternatively, the native interface associated with database 18 could be used for API 14. As an example, an implementation of the system using the well known Oracle™ Database Management System can use an Oracle™ API instead of ODBC. By linking the template 16 and the database 18 to the application tool via the API 14, compatibility is provided for any desired application tool, such as a report writer 12, that is compliant with the selected API 14. The database 18 can be accessed via a network, as in a typical client/server environment, or a user could access the template via the API on a server using a character-based interface.

The end user must, of course, have an information appliance that can connect to the relational database system either remotely or directly with an approved interface such as ODBC or a native interface connection. Moreover, the end user must be granted authority to access the simplification objects and views provided by template 16. Once access is granted, the user is able to invoke the software with a valid user identification and password, if necessary. The software then presents the objects of data that the user has been authorized to use.

Figure 2:
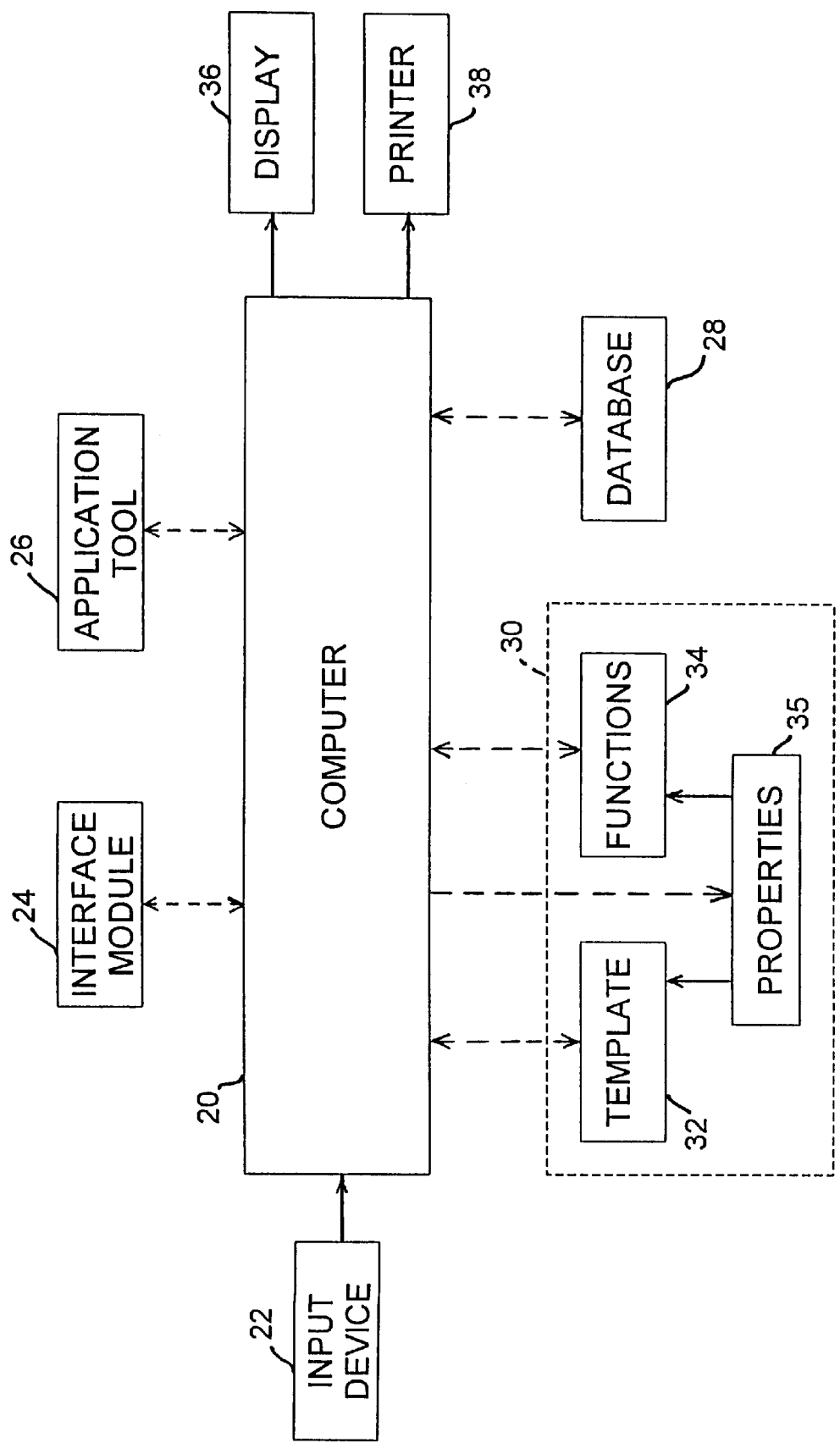
FIG. 2 is a block diagram of a computer system in which the user interface of the present invention is implemented.

FIG. 2 illustrates a computer system for implementing the invention. A computer 20, which is typically part of a network but may comprise a stand-alone PC or the like, receives user input via an input device 22 (e.g., a keyboard, mouse and/or voice recognition device). Computer 20 is connected to a display 36 (such as a conventional CRT monitor) and optionally, a printer 38 in a conventional manner.

The computer may run one or more applications, such as a spreadsheet, word processor, database, personal information manager, etc. In order to use the present invention, one of the applications run on computer 20 will include an application tool 26 that enables the user to generate an output, such as a database report. When the application tool 26 interfaces directly with the database 28 via computer 20, as is typical, the user will be required to understand and deal with the complexity of the database. The present invention obviates this problem by having the application tool 26 communicate via an interface module 24, that can provide simplified data access using a simplification layer 30 that can be stored together with the relational data of database 28. It is noted that in cases where the application tool 26 is directly compatible with the database 28, it can interface with the database either directly or through the simplification layer 30.

Figure 4:
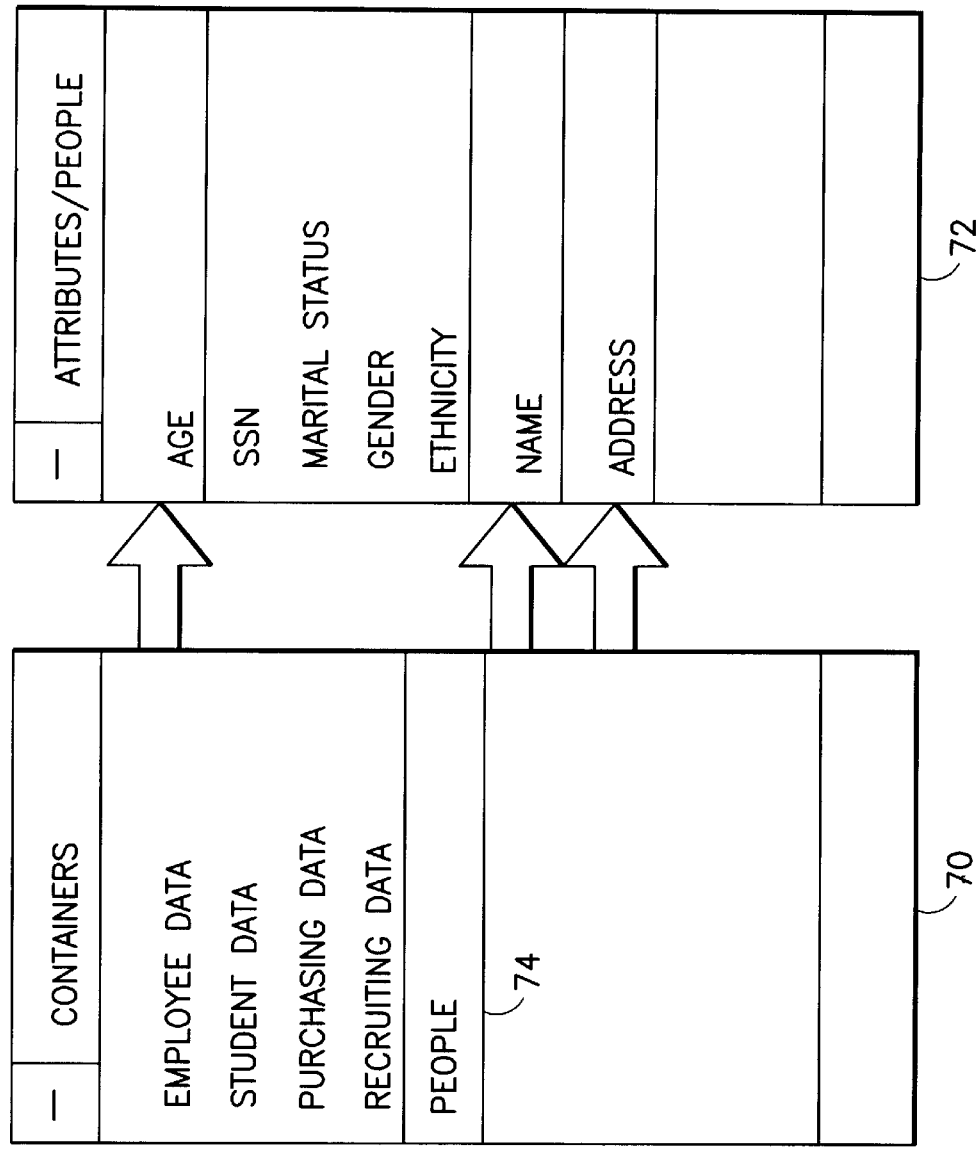
FIG. 4 is an illustration showing the availability of different templates (containers) that may be selected by a user and a resulting list of attributes for a template designated "people"

Simplification layer 30 includes template 32, functions 34 and properties 35. As described above, the template provides a simplified data access view to various attributes that are stored in database 28 or can be calculated from values stored in the database. Generally, it is intended that various different templates ("containers") will be provided, each corresponding to a different category, such as a report category. Thus, as illustrated in FIG. 4, a plurality of different containers is provided. The containers comprise an employee data container, student data container, purchasing data container, recruiting data container, and people container. A user can choose any of these containers.

In the event that a user chooses people container 74, the simplification layer 30 will send the list of attributes 72 to the application tool 26 via computer 20 and interface module 24. For example, in the event interface module 24 comprises an OBDC interface, both the simplification layer 30 and the application tool 26 will be ODBC compliant. Upon receiving the list of attributes corresponding to the selected container, the application tool will enable the user (e.g., via display 36 and input device 22) to select specific attributes to be shown, for example, on a database report. The selected attributes will be forwarded from the application tool back to the simplification layer 30 via interface module 24. The simplification layer comprises software that will determine if any of the attributes need to be calculated from data contained in the database using a function 34. The simplification layer will then access (from database 28) the necessary attributes or data required to calculate the attributes via computer 20 and interface module 24. Once obtained, the simplification layer forwards the attributes to the application tool 26 via interface module 24 and computer 20.

FIG. 5 illustrates a sample report which is generated using the people container 74 and resultant attributes 72 of FIG. 4. As illustrated, the report 80 includes the name, age and address of the people in the database, which are the only three attributes selected by the user via the simplified data access layer.

The age of the people in the database may not be stored, per se. Instead, in order to provide each person's age a function can be associated with the template provided to the user. The age function, which is one of the functions 34 illustrated in FIG. 2, is run when an end user selects the age of a person to be reported. In order to calculate age, the function translates the user request for age into a query for the person's birth date. A query is also made for the person's deceased date, and if there is a deceased date, then age is calculated by subtracting the birth year from the deceased year. If the birth month is less than the current month, then the age is reduced by one. If there is no deceased date, then the age is calculated by subtracting the birth year from the current year. If the birth month is less than the current month, then the age is reduced by one. Thus, it can be seen that the provision of functions can simplify the query that a user would otherwise have to make, in order to return a value that is not itself stored in the database.

In addition to providing a set of functions, the simplification layer 30 can also allow a user to specify certain properties 35 that will adapt the template and functions to the user's specific requirements. The properties can be input to the system via a "crosswalk/concept validation form" that sets up a cross-reference table linking a user defined term or condition to a general concept that is embodied in the template. For example, slotted, hierarchy, date and translation concepts may be defined using the crosswalk/concept validation form.

A slotted concept is one that requires the user to specifically designate which value from a database field should be put into each of the attributes within a repeating group in the template. A repeating group arises when multiple values are stored in a record. Some examples of fields that can have more than one value in a database used by an academic institution are address, donor category, and test code. To allow retrieval of more than one value for a field, the simplified data access layer 30 flattens out some fields. This means that where a database table may store, e.g., five values of a particular code in one field, the simplified data access layer has five attributes, one for each value. These attributes are referred to as a repeating group.

One slotted concept that an academic institution may want to configure on a template is "test scores." Since one student may have various test scores stored in the database, such as SAT Verbal, SAT Math, ACT and GRE, it is necessary for the institution to specify which score(s) it is interested in for a particular report. This information is specified in a crosswalk/concept validation form, and once specified, the simplified data access template 32 associated with the validation form will return the desired attributes each time it is accessed. Operationally, any time a template 32 requires clarification as to which of a plurality of possible attributes is meant for a particular concept, a cross-reference is obtained by looking up the properties 35 for that concept in the associated crosswalk/concept validation form. The properties are passed directly to the template or, if a complex attribute is involved, the properties are passed to the appropriate function 34 to enable the computation of the desired attribute. As indicated in FIG. 2, the properties 35 are established via computer 20 in response to user input received via input device 22.

Hierarchy concepts use a priority logic structure defined on the crosswalk/concept validation form to determine which values to return within a view. Using a sequence number to prioritize values, a hierarchy concept uses a process of elimination to determine which field values should be put into each of the attributes within a repeating group present in a template. Thus, for example, a template may provide access to an address when in fact, several addresses are available for each person in the database. In this instance, the user will enter properties on a crosswalk/concept validation form to specify an address priority, such as that the address desired is a local address, but if no local address is available, to provide a home address, and if no home address is available, to provide a summer address. The associated template will then find and return the first address that fits into this hierarchy.

A translation concept is used to convert user defined codes into correct internal codes for use by the simplified data access layer. Multiple external code values can be mapped to the same internal code value. For example, an academic institution may have its own codes for student type, e.g., freshman, sophomore, junior, senior and graduate. These codes are translated into the internal codes used by the simplified data access layer via a crosswalk/concept validation form. The form provides a look-up table cross-referencing the user codes to the internal codes.

A date concept allows users to override the processing date for which a report is run. Thus, where a template would normally assume that a report is to be generated for a default date (typically the current date), a user can specify that the template is to assume a different date (e.g., the last date of the preceding month) whenever the template is used.

It can be seen from the above that in addition to providing simplified access to data stored in the database, the system of the present invention allows a certain degree of customization in the templates that enable the simplified access. This is accomplished using the crosswalk/concept validation forms that cross-reference template concepts to user conventions. The validation forms provide a layer between the database and the templates, in order to implement the desired template customization.

Figure 3:
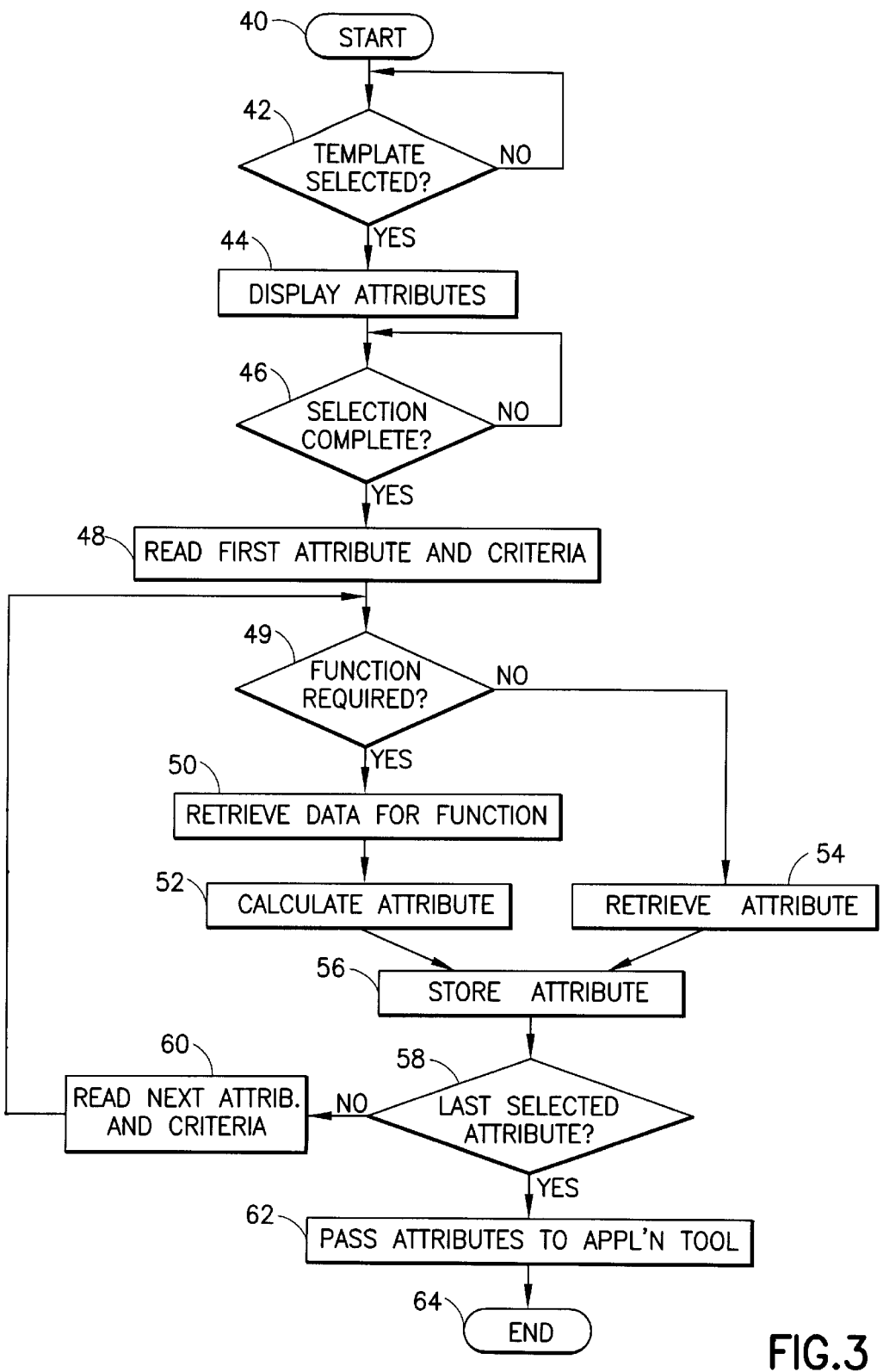
FIG. 3 is a flowchart illustrating an example in which attributes are retrieved for the generation of a database report.

FIG. 3 is a flowchart illustrating a routine for providing simplified data access to a user in accordance with the invention. The routine starts at box 40, and at box 42 a user selects a template (e.g., one of the "containers" illustrated in FIG. 4). Once a template is selected, the associated attributes (e.g., attributes 72 shown in FIG. 4) are displayed as indicated at box 44. A user will then select those attributes which are desired to be shown on a report. For example, in the illustration provided in FIG. 4, the user has selected age, name and address as the attributes to be reported. At the same time, the user will designate criteria for the selected attributes. Such criteria could comprise, for example, a range of dates for which the report is to be generated, or in the case of the illustration shown in FIG. 4, an age limit for the people to be listed on the report. Other criteria could, e.g., limit the report to particular countries or states, or limit the report to particular last names.

It should be appreciated that the user interaction necessary to select a template and select attributes and specify conditions is provided via application tool 26 (FIG. 2). The application tool will communicate with the simplified data access layer 30 via interface module 24, which can comprise an API with which the application tool 26 is compliant. The simplified data access layer 30 will provide the available templates and attribute choices to the application tool via the interface module 24. Once the user selections are complete, as determined at box 46, the attributes selected and the corresponding criteria (if any) will be passed from the application tool 26 to the simplified data access layer 30. In particular, as indicated at box 48, the first attribute selected by the user will be forwarded with any associated criteria to the simplified data access layer 30, which will determine whether a function is required in order to retrieve the attribute information desired by the user, as indicated at box 49. If no function is required, the attribute will be directly retrieved from the database 28 as indicated at box 54. On the other hand, if a function is required, the data necessary in the function calculation will be retrieved from the database as indicated at box 50. Then, at box 52, the attribute desired by the user will be calculated. Once the attribute is either directly retrieved at box 54 or calculated at box 52, it will be stored in a memory (not shown) coupled to computer 20 for subsequent use. It should be appreciated that if any criteria are associated with a particular attribute, the attribute will be filtered in accordance with the criteria when retrieved from the database. Thus, only attributes meeting the criteria condition(s) will be reported.

A determination is made at box 58 as to whether the attribute just stored was the last attribute selected by the user via the template. If not, the next attribute and any associated criteria is read at box 60, and the routine loops back to box 49 where a determination is made as to whether a function is required to calculate that attribute. The routine continues until all of the attributes selected by the user have been read, obtained from the database and stored. Once this has occurred, all of the attributes selected by the user will be passed back to the application tool via interface module 24, as indicated at box 62. The routine then ends at box 64.

It should now be appreciated that the present invention provides a simplified data access layer to a relational database. Instead of requiring a user to directly access the database via its internal fields, which can be complicated and difficult to query, simplified templates and associated functions are provided. Moreover, the simplified data access layer is independent of the application tool, such as a report writer, spreadsheet or other desktop tool through which the user accesses the database. This independence is provided by using an interface module, which can comprise an API such as ODBC, with which the application tool and the simplified data access layer are compliant. The template and functions of the simplified data access layer can be provided as stored database objects which encapsulate the semantics of the database, thereby isolating the complexity necessary to access the data. Complex logic is thereby encapsulated into reusable software components, which provide for consistency, extensibility and maintainability of the system using an object-oriented approach. The ability to control the objects externally using a rule-based architecture provides for user control of the encapsulated logic.

We claim:

1. An open database connectivity (ODBC) compliant system for accessing data from a relational database, comprising:

user input/output device for interacting with an ODBC compliant application tool accessible via a computer;

an ODBC interface;

an ODBC compliant template for simplifying access to complex data stored in said relational database, said template being accessible to said application tool via said ODBC interface for enabling user selection of attributes corresponding to a particular category, said attributes specifying information obtainable from data stored in said relational database and being selectable using said application tool;

said ODBC compliant template being responsive to selected attributes received from said application tool via said ODBC interface, for retrieving data from said relational database and forwarding said data to said application tool via said ODBC interface for use in generating an output;

wherein:

said ODBC compliant template is independent of said application tool, thereby enabling a user to access information from said relational database using any one of a plurality of different application tools; and said template (i) directly accesses attributes selected via said application tool when the selected attributes are stored in the database or (ii) when the selected attributes are not stored in the database, enables complex attributes selected via said application tool to be calculated via selectively executable algorithms by obtaining data from said database that is required by said algorithms.

2. An ODBC compliant system in accordance with claim 1 comprising a plurality of different ODBC compliant templates, each providing a set of attributes corresponding to a different category, said attributes specifying information obtainable from data stored in said relational database for their associated category.

3. An ODBC compliant system in accordance with claim 2 wherein said ODBC interface comprises an application program interface (API) for allowing said application tool, said templates, and said database to communicate.

4. An ODBC compliant system in accordance with claim 1 comprising a plurality of different ODBC compliant templates, each providing a set of attributes corresponding to a different category, said attributes specifying information obtainable from data stored in said relational database for their associated category.

5. An ODBC compliant system in accordance with claim 1 wherein said application tool includes at least one of a report writer, statistical analysis tool, spreadsheet and desktop tool that is ODBC compliant.

6. An ODBC compliant system in accordance with claim 1 wherein said ODBC interface comprises an application program interface (API) for allowing said application tool, said templates, and said database to communicate.

7. An ODBC compliant system in accordance with claim 1 wherein said template requires a user to designate, via said application tool, information for at least one mandatory condition.

8. An ODBC compliant system in accordance with claim 1 wherein said application tool is provided with direct access to said database in addition to access to said database via said template.

9. An ODBC compliant system in accordance with claim 8 wherein:

said application tool and said template are ODBC compliant; and data obtained by said application tool directly from said database and data obtained by said application tool via said template are able to be combined due to the ODBC compliant nature of said tool and template for use in generating said output.

10. An ODBC compliant system in accordance with claim 1 further comprising means for enabling a user to specify properties for customizing said template.

11. An ODBC compliant system in accordance with claim 10 wherein said properties are specified using said application tool.

12. An ODBC compliant system in accordance with claim 1 wherein said template comprises:

a meta layer that dynamically converts data from said relational database into a simplified conceptual format.

13. An ODBC compliant system in accordance with claim 12 wherein said simplified conceptual format is a format that avoids the complexity of relationships within the structure of said relational database.

* * * * *